C. B. KIRKHAM AND A. L. THURSTON.
CONTROL MECHANISM.
APPLICATION FILED FEB. 8, 1919.

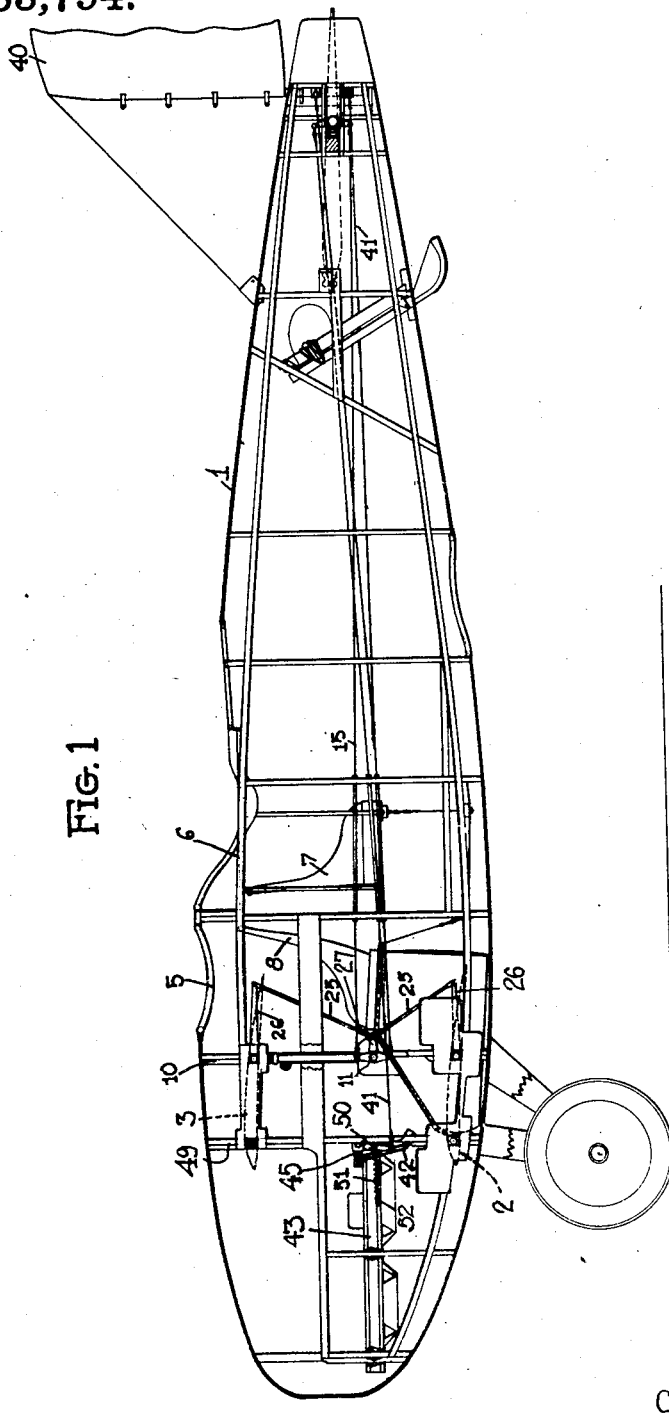

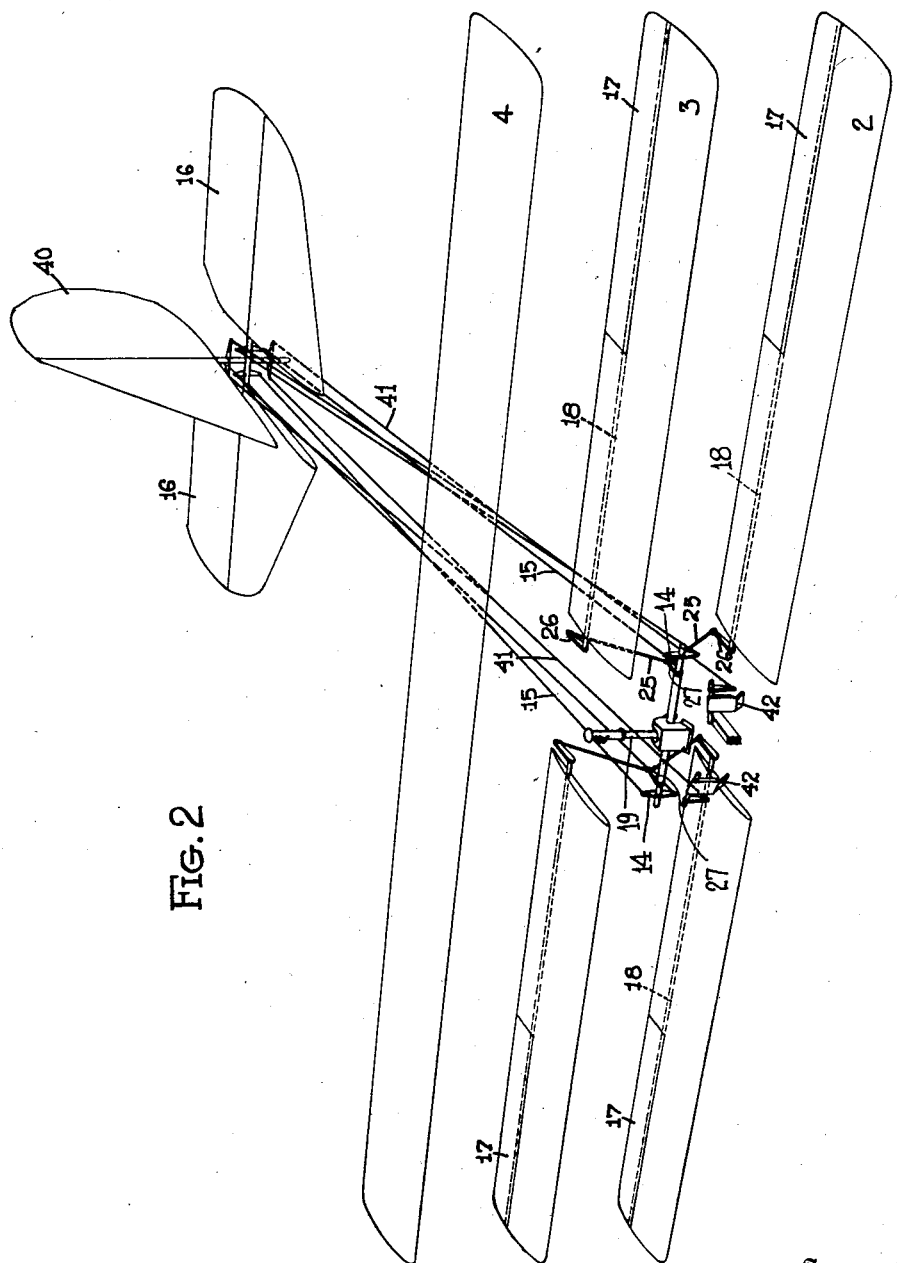

1,363,794.

Patented Dec. 28, 1920.
5 SHEETS—SHEET 3.

Inventors
CHARLES B. KIRKHAM
ARTHUR L. THURSTON

C. B. KIRKHAM AND A. L. THURSTON.
CONTROL MECHANISM.
APPLICATION FILED FEB. 8, 1919.
1,363,794.
Patented Dec. 28, 1920.
5 SHEETS—SHEET 4.
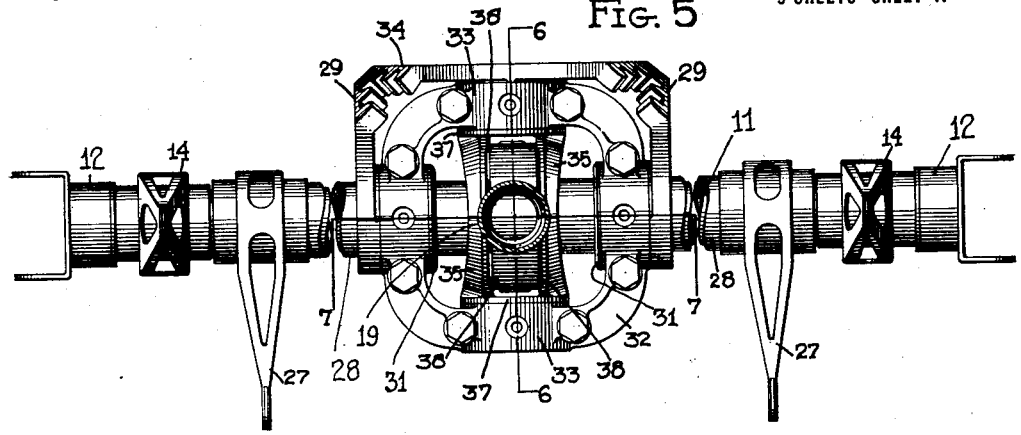
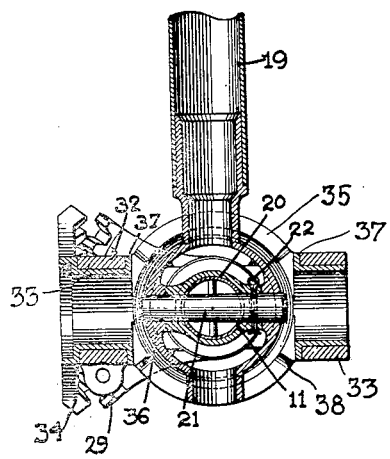
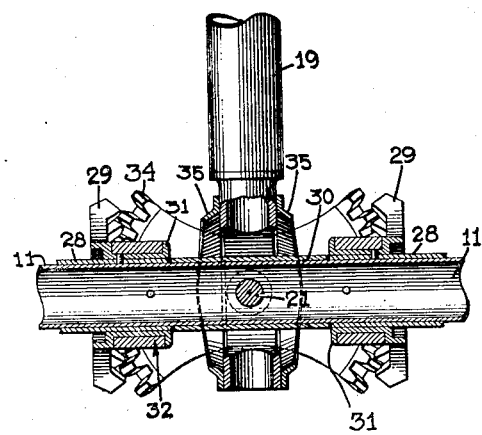
Inventors
CHARLES B. KIRKHAM
ARTHUR L. THURSTON
By their Attorney

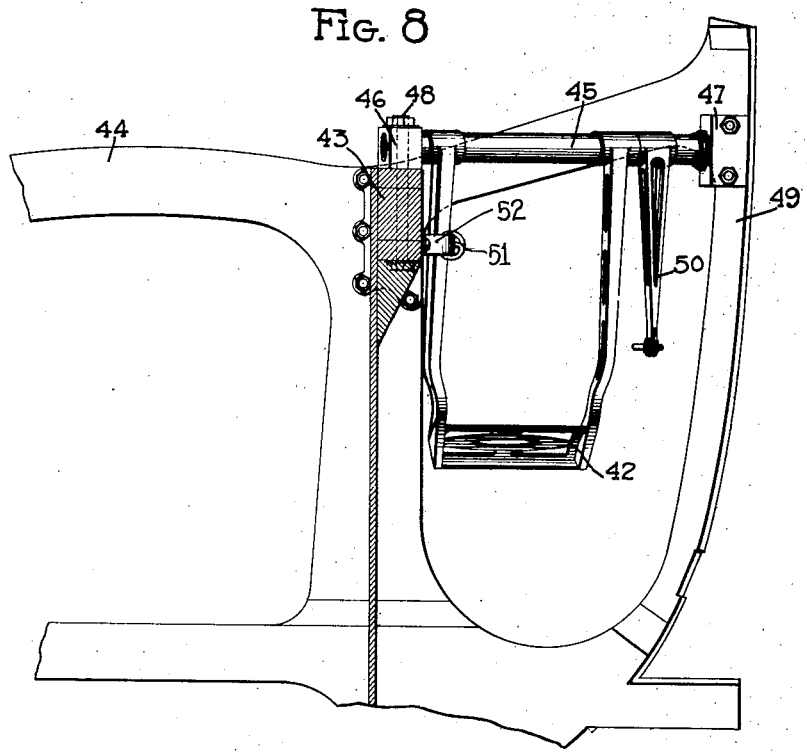
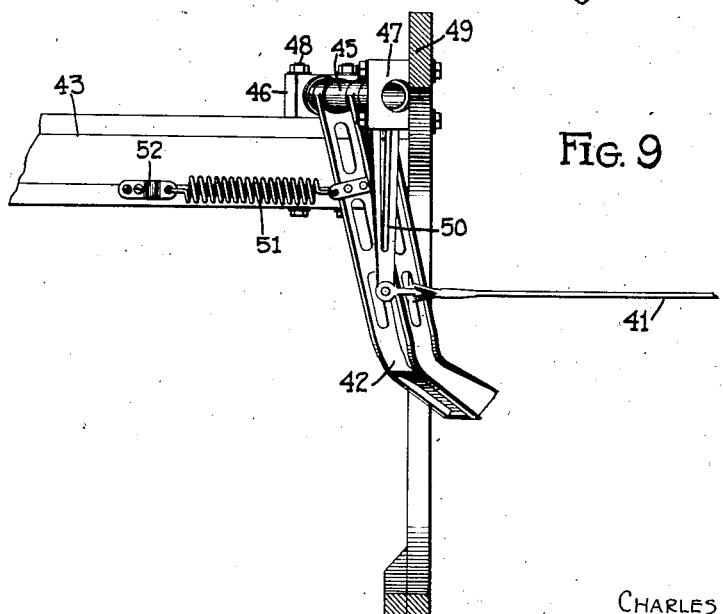

UNITED STATES PATENT OFFICE.

CHARLES B. KIRKHAM, OF GARDEN CITY, AND ARTHUR L. THURSTON, OF JAMAICA, NEW YORK, ASSIGNORS, BY MESNE ASSIGNMENTS, TO CURTISS AEROPLANE AND MOTOR CORPORATION, OF BUFFALO, NEW YORK, A CORPORATION OF NEW YORK.

CONTROL MECHANISM.

1,363,794.  Specification of Letters Patent.   Patented Dec. 28, 1920.

Application filed February 8, 1919. Serial No. 275,842.

*To all whom it may concern:*

Be it known that CHARLES B. KIRKHAM, and ARTHUR L. THURSTON, citizens of the United States, residing, respectively, at Garden City, in the county of Nassau, State of New York, and Jamaica, county of Queens, State of New York, have invented certain new and useful Improvements in Control Mechanism, of which the following is a specification.

This invention relates to aircraft and particularly to improvements in control mechanism therefor.

An object of the invention is a simplified and improved control mechanism as used on aircraft of the aeroplane type, especially the mechanism for effecting the control of the balancing surfaces, including the ailerons, the elevators, and the rudders. The improvements reside in the manner of operating these surfaces, in the location of the operating devices with relation to the operator and in the constructional features thereof, whereby the control itself is simplified and the control devices manufactured and assembled at a minimum expenditure of time and labor.

For a better understanding of these improvements, the advantages above outlined and others which will appear hereinafter, reference may be had to the following drawings, wherein:

Figure 1 is a sectional view through the longitudinal axis of the fuselage of an airplane embodying the improvements.

Fig. 2 is a perspective view of the supporting surfaces together with the control surfaces and the improved operating devices.

Fig. 5 is a plan view of the control devices operated by the control stick.

Fig. 6 is a section on the line 6—6 of Fig. 5.

Fig. 7 is a section on the line 7—7 of Fig. 5.

Fig. 8 is a front view of a portion of the devices for effecting control of the rudder, and Fig 9 is a side view corresponding to Fig. 8.

Figure 4:
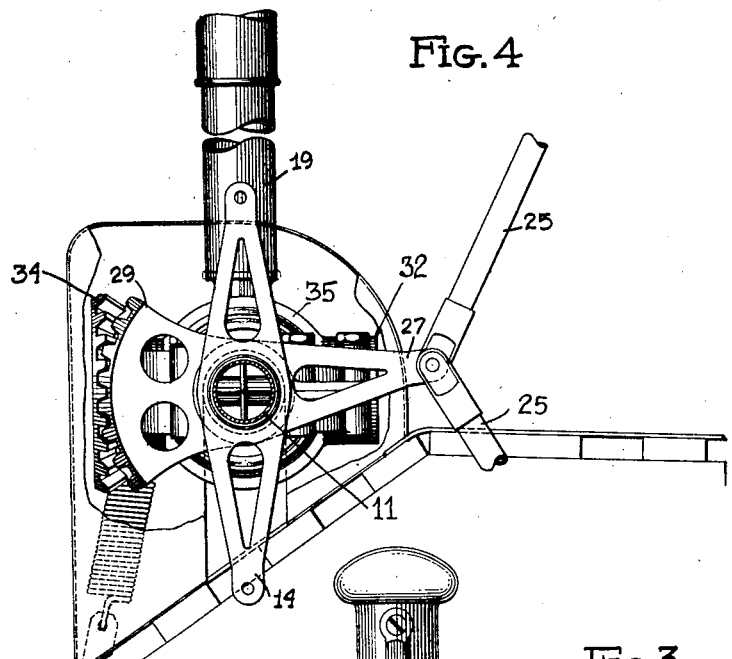
Fig. 4 is a side view thereof.

Referring to the drawings where like numerals represent the similar parts throughout, the improvements are illustrated as embodied in an aircraft of the airplane type, the fuselage or main body being indicated by the numeral 1 and the supporting planes, three in number, being designated by the numerals 2, 3 and 4. The body, 1, has two cockpits therein, a forward cockpit 5, and a rear cockpit 6, the latter serving as a pit for the observer or gunner, or other passenger, and the former serving as a cockpit for the pilot. The seats are designated respectively by the numerals 7 and 8.

Figure 3:
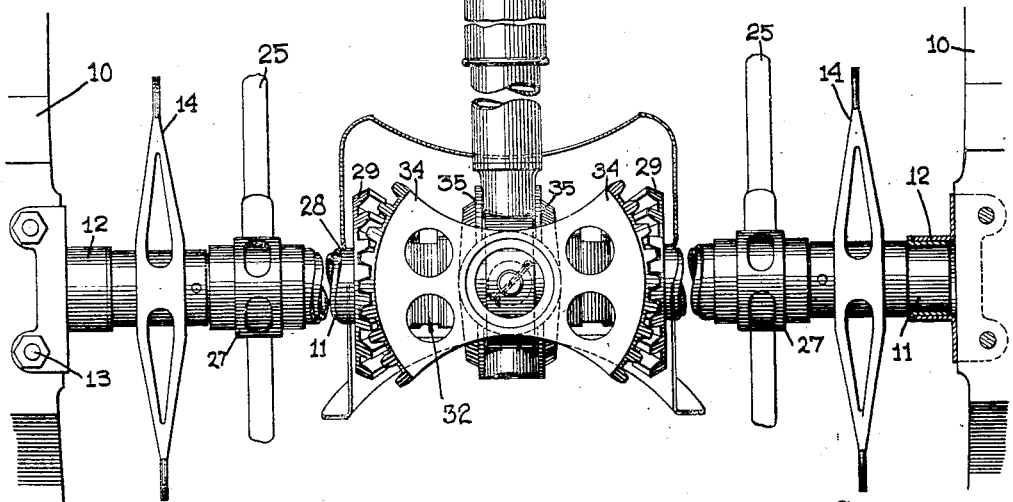
Fig. 3 is an end view of the control devices including a control stick.

The fuselage or body 1, is of a well known type embodying a plurality of diaphragm or bracing rib members positioned substantially parallel to each other and spaced from each other longitudinally of the craft. One of these diaphragms or ribs is indicated at 10, being spaced from the forward end of the body and located immediately in front of the pilot's seat 8. This diaphragm or rib carries a walking beam shaft 11, this shaft bridging the body and being journaled in the bearings 12 which respectively engage the opposite sides of the rib 10 and are secured thereto in a substantial manner as by means of the securing bolts 13. The shaft 11 carries the walking beams 14 which are operatively connected through cable connections 15 with the elevator 16, it being understood that the walking beams 14 are securely fixed to the shaft 12 to rotate therewith. The ailerons or lateral balancing surfaces are indicated at 17, it being observed that in the particular embodiment of improvements herein illustrated, that these ailerons are incorporated only in the two lower planes, 2 and 3, which intersect the fuselage body. These ailerons are mounted for a pivotal movement on the transverse shafts or axes 18, these shafts being suitably and conveniently mounted within the wing structure. For operating these ailerons through the medium of their rock shafts 18, there are provided the control and operating devices illustrated more particularly in Figs. 3 to 7. These devices include the operating member or control stick 19. The shaft 11 carries a collar or sleeve 20. The stick 19 is bifurcated at its lower end and straddles or surrounds the shaft 11 and the collar 20 and is trunnioned thereto by means of the securing pin 21, this pin 21 passing transversely through the shaft 11, the collar 20 and the bifurcated ends of the stick 19. These parts are maintained in the assembled position, as for instance, by means of the cotter pin 22 which extends through the jaws of the sleeve 20 and the transverse pivot pin 21. The stick 19 thereby is capable of pivotal movement in the axial plane of the shaft 11 independently thereof, but the shaft may be oscillated to operate the walking beams 14 and through these effect control of the elevator 16 by the movement of the stick 19 in the plane transversely of the axis of the shaft.

The devices effecting control of the ailerons will now be described. Each of the rock shafts 18 is operatively connected through the medium of the connecting link 25 and the crank arms 26 with the crank arms 27 carried by the shaft 11. There are two of these cranks 27, one each for effecting control of the lateral balancing surfaces on either side of the machine and these crank arms are fixed respectively to sleeves 28 which are journaled upon the shaft 11. These sleeves 28 carry on their inner ends sectors of the bevel pinions 29, the pinions 29 being fixed to these sleeves to operate the crank arms 27 and through the operation of these crank arms effect control of the lateral balancing surfaces. The collar 20 is carried by a spacing sleeve 30 which maintains the sleeves 28 and consequently the pinion 29 in the proper spaced relation; these pinions 29 have their hubs extended inwardly to form bearing or guide surfaces 31 for the casting 32, the general shape of this casting 32 being more apparent in Fig. 5. This casting or frame 32 is formed on its forward and rearward sides with the bearings 33 and within these bearings 33 there is journaled a carrier for the operating gear sector 34, the latter meshing with the sectors 29 for effecting control of the lateral balancing surfaces. The carrier for the sector 34 is formed with the parallel members 35 which are spaced from each other a sufficient distance to embrace the bifurcated end 36 of the control stick 19. It is observed that these guide members 35 are formed with collars 37 which engage with the inner sides of the bearings 33 whereby the carrier is maintained in its proper operative position. It is also noted that the inner sides of these guide members 35 are provided with the shoulders 38 for limiting the to and fro movement of the stick 19. The operation of these devices will be apparent from the above description. When it is desired to effect control of the control surfaces 17, the operating stick is actuated in the plane coincident with the axis of the shaft 11 whereby the carrier sector 34 together with its guide members 35 are rotated in the trunnion bearings 33 and the sector 29 on the opposite sides thereof, are rotated in opposite directions to effect similar control of the surfaces 17. It is observed that the control mechanism is entirely devoid of cable connections and that the control is effected entirely through the medium of the simple devices illustrated, including the rock shaft 18 and bell cranks 25, 26 and 27, and connecting links 25. It is noted particularly that all of these controls are located in a position within the fuselage body, the shafts 18 extending transversely of the machine to points within fuselage for engagement with the control devices.

The control rudder is indicated at 40, and this is operable through the cable connections 41 by means of operating pedals 42 arranged forward of the pilot's seat 8 and on opposite sides of the engine bed. Referring particularly to Figs. 8 and 9, one of the engine bed beams 43 is carried by the diaphragm support 44, the particular beam illustrated, being a left hand beam looking forward from the pilot's cockpit. Each of the pedals 42 is carried by a shaft 45, the shafts 45 being pivotally and rotatively mounted within the bearing blocks 46 and 47. The bearing block 46 is carried upon and secured to the beam 43, as by means of securing bolts 48, while the bearing block 47 is carried by and secured to the upright web 49 of the diaphragm 44. It is observed that the shaft 45, together with the pedal 42, are so mounted that the inner ends of the shaft incline slightly forward, the bearing block 46 being located at a point forward of the location of the bearing block 47. The cables 41 are connected to the pedals 42 and the shafts 45 through the medium of the usual crank arms 50. Springs 51 for each of the pedals 42 may be provided for biasing the rudder 40 to a neutral position, one end of the springs being attached directly to the pedal and the other end being attached forwardly thereof to the beam 43 as by means of the eye connection 52. The operation of the rudder will be obvious from an inspection of the drawings. The operation of one of the pedals 42 in a forward direction will actuate the rudder 40 to that side upon which the operating pedal is located and the movement of the pedal and the rudder will be transmitted through the cable connections with the opposite pedal, the spring on the opposite side being placed under tension to bring the rudder back to a neutral position when the operating force is removed. A particular advantage of this arrangement in the control of the rudder is the location of the control devices, as for instance, the foot pedals upon the opposite sides of the rear of the engine and engine bed whereby a minimum of space is occupied and at a place where it is available. Other advantages reside in the simple and rugged nature of the rudder operating devices whereby the devices may be standardized, manufactured, and assembled with a minimum expenditure of time and labor and whereby the operation is rendered reliable under all circumstances.

In accordance with requirements of the patent statutes we have set forth one embodiment of the present improvements, but it is understood that the claims appended hereto are not to be construed as limited to the specific devices illustrated, except as is specifically recited therein, but are to be construed to cover the spirit of the improvements, due regard being had to a consideration of the prior art.

What is claimed is:

1. In a control mechanism for aircraft, the combination of lateral balancing surfaces disposed in pairs on opposite sides of the longitudinal axis of the machine, said balancing surfaces being mounted on rock shafts disposed longitudinally of the supporting surfaces and projecting into the main body of the craft, a rock shaft disposed within said main body, control devices for actuating said last named shaft, and lever and link connections between the last mentioned rock shaft and said first mentioned rock shafts, said connections being disposed within the main body of the craft for the purpose set forth.

2. In a control mechanism for aircraft, the combination of a fuselage body, supporting wings intersecting said fuselage body, ailerons carried by said supporting wings, said ailerons being mounted on rock shafts extending longitudinally of the wings and projecting into the fuselage body, a stick control mounted within the fuselage body comprising an oscillatable frame carrying a beveled gear, a sleeve carried by the rock shaft, a pair of oscillatable levers carried by the sleeve and mounted for pivotal movement on opposite sides of said oscillatable frame, said levers carrying beveled gears which mesh with said first named gear, and link connections between said levers and said rock shaft, all disposed within said main body for the purpose set forth.

3. In a control mechanism for aircraft, the combination of lateral balancing surfaces and means for actuating these surfaces comprising a rock shaft, a stick operating member pivoted to said rock shaft for movement in the plane of said rock shaft, a frame oscillatable with said stick independently of the rock shaft and carrying a beveled gear, a pair of crank arms mounted on opposite sides of said oscillatable frame, said crank arms being mounted on rotatable sleeves carried by said rock shaft, said sleeves carrying beveled gears intermeshing with said first named gear, and connections from said arms to said control surfaces for the purpose set forth.

4. In a control mechanism for aircraft, the combination of an elevator and lateral balancing ailerons with actuating mechanism therefor comprising a rock shaft carrying a pair of walking beams, cable connections from said walking beams to said elevators, an operating member for oscillating said rock shaft, said operating member being pivoted thereto for oscillation independent thereof in the plane of said rock shaft, an oscillatable frame carried by said operating member and carrying a beveled gear on one side thereof, a pair of sleeves carried by said rock shaft on opposite sides of said oscillatable frame, said sleeves having gears intermeshing with said first named gear, and lever and link connections between said oscillatable sleeves and said lateral balancing ailerons.

5. In a control mechanism for aircraft, the combination of supporting wings, ailerons carried by said supporting wings, said ailerons being mounted on rock shafts extending longitudinally of the wings, a stick control comprising an oscillatable frame carrying a beveled gear, a divided sleeve carried by the rock shaft, a pair of oscillatable levers carried by the respective sleeve sections and mounted for pivotal movement on opposite sides of said oscillatable frame, said levers carrying beveled gears which mesh with said first named gear, and link connections between said levers and said rock shaft.

6. In a control mechanism for aircraft, the combination of a balancing control surface and a directional control surface, a control lever, a rock shaft, a sleeve mounted on the rock shaft, a connection between the control lever and the rock shaft, a connection between the control lever and the sleeve, a connection between the rock shaft and one of the control surfaces, and a connection between the sleeve and the other of the control surfaces, the relative arrangement of the various connections being such that both control surfaces are actuated by movement of the control lever.

7. In a control mechanism for aircraft, the combination of balancing surfaces mounted on opposite sides of the fore and aft axis of the craft and a directional control surface, a rock shaft, a control lever, a connection between the control lever and the rock shaft for actuating the directional control surface by movement of the control lever transversely of the rock shaft, a divided sleeve mounted on the rock shaft, the sleeve sections being disposed at opposite sides of the control lever, connections respectively between the sleeve sections and the balancing surfaces, and a gear connection between the control lever and the opposed sleeve sections for simultaneously though oppositely actuating the balancing surfaces by movement of the control lever longitudinally of the rock shaft.

8. In a control mechanism for aircraft, the combination of a fuselage body, supporting wings intersecting said fuselage body, ailerons carried by said supporting wings, said ailerons being mounted on rock shafts extending longitudinally of the wings and projecting into the fuselage body, a stick control mounted within the fuselage body and comprising an oscillatable frame carrying a beveled gear, a pair of oscillatable levers mounted for pivotal movement on opposite sides of said oscillatable frame, said levers carrying beveled gears which mesh with said first named gear, link connections between said levers and said rock shaft, a casing within which the beveled gears are inclosed, a means inside the casing for yieldingly holding the ailerons in neutral position, the casing, the levers, and the link connections between said ailerons and said rock shafts being all inclosed in the fuselage body of the craft.

9. In a control mechanism for aircraft, the combination of a fuselage body, an engine bed, a rock shaft on each side of said engine bed, each rock shaft being separately journaled within bearings carried respectively by the engine bed and the fuselage body, a control surface to be actuated, cable and lever connections from said surface to said rock shafts, means for operating said rock shafts, and tension springs interposed between the engine bed and said operating means whereby upon the actuation of one of the said rock shafts, one of said springs is put under tension and said control surface is actuated.

10. In a control mechanism for aircraft, the combination of a fuselage body comprising a transverse bracing diaphragm, an engine bed intersecting said diaphragm, a rock shaft interposed on either side of said engine bed, and having one end journaled on the engine bed and the other end journaled on the transverse diaphragm, said rock shafts carrying operating pedals and connecting levers, a control surface, cable connections from said levers to said surface, and tension springs interposed between said pedals and said engine bed for retaining the control surface and the control devices in a neutral position.

In testimony whereof we hereunto affix our signatures.

CHARLES B. KIRKHAM.
ARTHUR L. THURSTON.